P. LISTEMAN.
Gate.
No. 208,746. Patented Oct. 8, 1878.
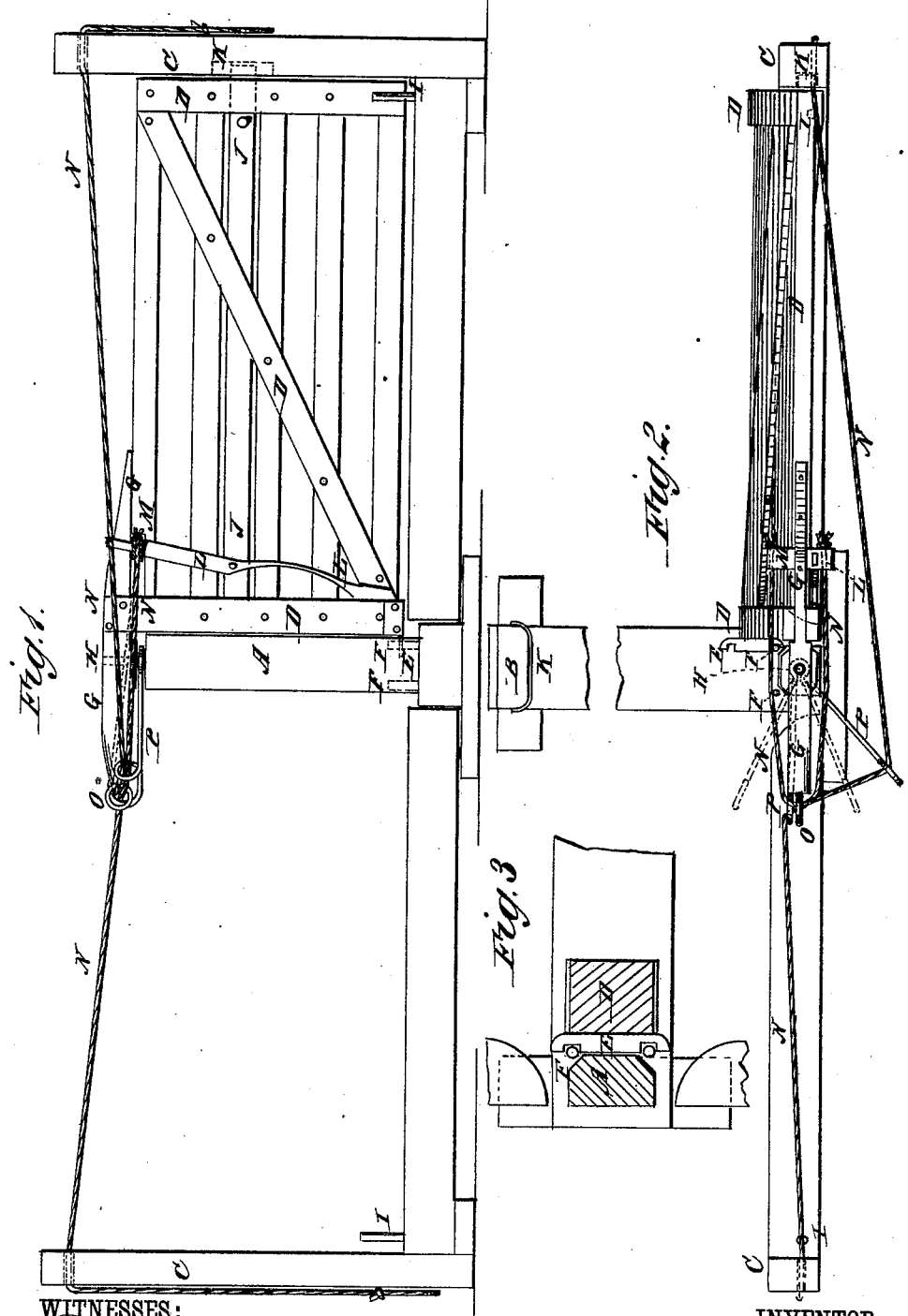
WITNESSES:
INVENTOR:
ATTORNEYS.

UNITED STATES PATENT OFFICE.

PHILIP LISTEMAN, OF COLLINSVILLE, ILLINOIS, ASSIGNOR TO HIMSELF AND JOHN W. DAVIS, OF SAME PLACE.

IMPROVEMENT IN GATES.

Specification forming part of Letters Patent No. 208,746, dated October 8, 1878; application filed July 16, 1878.

*To all whom it may concern:*

Be it known that I, PHILIP LISTEMAN, of Collinsville, in the county of Madison and State of Illinois, have invented a new and useful Improvement in Gates, of which the following is a specification:

Figure 1 is a side view of my improved gate opened. Fig. 2 is a top view of the same. Fig. 3 is a detail section, showing the lower hinge.

Similar letters of reference indicate corresponding parts.

The object of this invention is to furnish an improved gate which shall be so constructed that it may be conveniently opened and closed by a person upon horseback or in a vehicle, and which shall be simple in construction and easily operated.

A represents the rear post, to which the gate is hinged. B is the front post, to which the gate is latched when closed. C are the side posts, to which the gate is latched when opened. D is the gate, which is constructed in the usual way, and which may be made in any desired style.

To the lower end of the rear end bar of the gate D is attached a cross-head plate or bolt, E, in the rear edge of the cross-head of which, near its ends, are formed notches to receive the hooks F, which are attached to the rear post A, and one or the other of which serves as a pivot, as the gate is opened in one or the other direction, to throw the gate into an inclined position, so that its weight may serve as an assisting force in swinging it open and shut.

To the rear part of the gate is attached the forward part of a lever, G, which extends back across the top of the post A, and is pivoted to a pin, H, passing through it and attached to the said top of the post A, to serve as the upper hinge of the gate, and as the fulcrum of the leverage by which the gate is swung open and shut.

The gate is kept from going too far when swung open by short stakes or posts I, driven into or set in the ground at the inner sides of the posts C, or by stops attached to the said posts C.

The gate D is fastened shut and open by a latch, J, which engages with catches K, formed in or upon or attached to the posts A C C.

The latch J slides in slots or openings in or between the cross-bars of the gate D, and its forward end is beveled upon both sides, so that it will be pushed back automatically by the inclined sides of the catches K as the gate swings open and shut.

The latch J is pushed forward by the spring L, which is pivoted to its rear part, and the lower end of which is attached to the lower part of the inner side of the rear cross-bar of the gate D.

To the upper end of the spring L is attached, or upon it is formed, a cross-head, M, to the ends of which are attached the ends of two cords, N. The cords N pass along the opposite sides of the rear part of the lever G, and through an eye, O, attached to the rear end of the said lever G, or through a hole formed in the rear end of the said lever G. After leaving the rear end of the lever G the cords N pass through holes or eyes in the ends of the arms of the V-lever P, which is pivoted at its angle to the pin H, to which the lever G is pivoted. The outer ends of the cords N are connected with posts upon the opposite sides of the rear post A.

In the drawings, the outer ends of the cords N are represented as being connected with the side posts, C; but in practice they should be connected with posts set at such a distance from the rear post, A, that the horses and vehicles may always be out of the way of the swing of the gate as it is swung open and shut by pulling upon the ends of the said cords.

With this construction, when the gate D is open the V-lever P gives a leverage to the cords N, so that the gate can be readily closed by pulling upon the said cords.

Having thus described my invention, I claim as new and desire to secure by Letters Patent—

The combination, with a swinging gate, of the lever G, pivoted on post A and made fast to gate, the latch-spring L, having cross-head M, the cords N, and the V-lever P, as shown and described, for the purpose specified.

PHILIP LISTEMAN.

Witnesses:
   W. C. HADLEY,
   J. H. B. WILLOUGHBY.